US012658773B2

(12) United States Patent
Abraham

(10) Patent No.: US 12,658,773 B2
(45) Date of Patent: Jun. 16, 2026

(54) MANUFACTURING METHOD FOR A BRUSHLESS DIRECT CURRENT ELECTRIC MOTOR

(71) Applicant: CIRCOR INDUSTRIA, Le Plessis Trevise (FR)

(72) Inventor: Sylvain Abraham, Angers (FR)

(73) Assignee: CIRCOR INDUSTRIA, Le Plessis Trevise (FR)

( * ) Notice: Subject to any disclaimer, the term of this patent is extended or adjusted under 35 U.S.C. 154(b) by 720 days.

(21) Appl. No.: 17/987,021

(22) Filed: Nov. 15, 2022

(65) Prior Publication Data

US 2023/0066003 A1 Mar. 2, 2023

Related U.S. Application Data

(62) Division of application No. 16/665,974, filed on Oct. 28, 2019, now Pat. No. 11,532,975.

(30) Foreign Application Priority Data

Oct. 29, 2018 (FR) ...................................... 1860005

(51) Int. Cl.
*H02K 29/03* (2006.01)
*H02K 1/14* (2006.01)
(Continued)

(52) U.S. Cl.
CPC ............. *H02K 29/03* (2013.01); *H02K 1/146* (2013.01); *H02K 1/185* (2013.01); *H02K 1/278* (2013.01);
(Continued)

(58) Field of Classification Search
CPC ........ H02K 1/146; H02K 1/148; H02K 1/185; H02K 1/278; H02K 15/022; H02K 15/12; H02K 21/16; H02K 29/03
(Continued)

(56) References Cited

U.S. PATENT DOCUMENTS 6,075,304 A * 6/2000 Nakatsuka ............... H02K 3/38
310/43
6,384,505 B1 5/2002 Horng et al.
(Continued)

FOREIGN PATENT DOCUMENTS

EP 1770847 A2 4/2007
EP 2579429 A1 4/2013
(Continued)

OTHER PUBLICATIONS

EP Search Report dated Nov. 28, 2019, for the EP Application No. EP19204507, filed on Oct. 22, 2019.

*Primary Examiner* — Minh N Trinh
(74) *Attorney, Agent, or Firm* — KDW FIRM PLLC

(57) ABSTRACT

A method for manufacturing a brushless motor includes providing a sleeve having a plurality of deformation zones spaced around a circumference of the sleeve, and a plurality of counterbores each having a rounded bottom and extending over the length of an inner surface of the sleeve such that only one of said plurality of counterbores is disposed between adjacent ones of said plurality of deformation zones. Metal rings are stacked to form a stator having a plurality of partitions each having a flat end face for engaging the inner surface of the sleeve. Copper wires are wound around the partitions, and the stack is mounted in the sleeve so that the end faces of the plurality of partitions are positioned adjacent the deformation zones. A rotor is provided, and is inserted into an inner cavity of the stator.

14 Claims, 4 Drawing Sheets

(51) Int. Cl.

| | |
|---|---|
| *H02K 1/18* | (2006.01) |
| *H02K 1/278* | (2022.01) |
| *H02K 15/022* | (2025.01) |
| *H02K 15/12* | (2025.01) |
| *H02K 21/16* | (2006.01) |

(52) U.S. Cl.

CPC ........... *H02K 15/022* (2013.01); *H02K 15/12* (2013.01); *H02K 21/16* (2013.01)

(58) Field of Classification Search

USPC .................................................. 29/596–598

See application file for complete search history.

(56) References Cited

U.S. PATENT DOCUMENTS

| | | | | |
|---|---|---|---|---|
| 6,429,568 | B1 | 8/2002 | Shen et al. | |
| 6,483,221 | B1 * | 11/2002 | Pawellek | H02K 1/148 |
| | | | | 310/216.066 |
| 6,784,582 | B1 | 8/2004 | Kolomeitsev et al. | |
| 7,560,844 | B2 | 7/2009 | Miyashita et al. | |
| 9,948,151 | B2 * | 4/2018 | Ando | H02K 1/187 |
| 10,734,850 | B2 | 8/2020 | Li et al. | |
| 11,532,975 | B2 * | 12/2022 | Abraham | H02K 15/022 |
| 2005/0067913 | A1 | 3/2005 | Kolomeitsev et al. | |
| 2007/0273234 | A1 | 11/2007 | Melfi | |
| 2008/0191578 | A1 | 8/2008 | Evans | |
| 2009/0085415 | A1 | 4/2009 | Ionel et al. | |
| 2010/0007236 | A1 | 1/2010 | Sano et al. | |
| 2011/0169367 | A1 | 7/2011 | Bourqui et al. | |
| 2013/0038169 | A1 | 2/2013 | Sato | |
| 2015/0042194 | A1 | 2/2015 | Li et al. | |
| 2015/0381022 | A1 * | 12/2015 | Major | H02K 11/33 |
| | | | | 425/116 |
| 2016/0315508 | A1 | 10/2016 | Li et al. | |
| 2018/0019648 | A1 | 1/2018 | Asgari et al. | |
| 2018/0020923 | A1 | 1/2018 | Maeda | |
| 2019/0036391 | A1 * | 1/2019 | Brohm | H02K 3/522 |
| 2020/0136486 | A1 | 4/2020 | Abraham | |
| 2023/0066003 | A1 * | 3/2023 | Abraham | H02K 1/146 |

FOREIGN PATENT DOCUMENTS

| | | | |
|---|---|---|---|
| EP | 3706287 | A1 | 9/2020 |
| TW | 201236318 | A | 9/2012 |
| WO | 2018008328 | A1 | 1/2018 |

* cited by examiner

MANUFACTURING METHOD FOR A BRUSHLESS DIRECT CURRENT ELECTRIC MOTOR

CROSS-REFERENCE TO RELATED APPLICATIONS

This is a divisional application of pending U.S. patent application Ser. No. 16/665,974, filed Oct. 28, 2019, now U.S. Pat. No. 11,532,975, issued on Dec. 20, 2022, which claims priority to French national patent application serial number 1860005, filed Oct. 29, 2018, the entirety of which are incorporated by reference herein.

BACKGROUND

The present invention relates to a brushless direct current electric motor with reduced cogging torque. Such cogging torque is also referred to as notching torque. For the sake of readability, the term "cogging" will be preferably used hereafter.

The invention also relates to a method for producing such a motor. A brushless direct current motor is commonly referred to as a brushless motor. Such a motor comprises a rotor, made up of at least one permanent magnet, and a stator comprising a plurality of coils generating a magnetic field. The coils are powered sequentially. In this way, a magnetic field is generated that rotates at the same frequency as the power supply voltages of the phases. The permanent magnet(s) of the rotor attempt to be oriented at each instant in the direction of the magnetic field, which leads to the rotational movement of the rotor. The supply voltages of the phases are continuously adapted so that the field remains in advance of the position of the rotor, in order to obtain a motor torque. A brushless motor converts electric energy into magnetic energy and then into a mechanical rotation movement.

Some brushless motors are configured with the rotor positioned around the stator. This configuration allows high motor torque to be obtained with a relatively low rotation frequency.

Other types of brushless motor, which are more common, have a mirror configuration, namely a rotor inserted into the stator. In this case, the rotation speeds are higher for a lower torque, for an equivalent size of motor. Rotor-in-stator type brushless motors are used in some fields where torque must be provided in a limited space, with safe and continuous operation. They are found, for example, in the aeronautical field for electromechanical actuators.

Hereafter, for the sake of readability, the invention will be described for a brushless motor with the rotor inserted into the stator, with it being understood that the invention is also applicable in the mirror configuration, namely with a rotor surrounding the stator.

In the illustrated configuration, the stator forms a circular based hollow cylinder with a central volume that receives the rotor, which is also in the form of a solid, circular based cylinder. The rotor comprises a shaft for driving a defined component. Radial partitions extend between the central volume and the outer wall of the stator. The partitions together define unitary volumes or notches, which are open toward the rotor. De facto, these notches surround the rotor when said rotor is introduced into the central volume of the stator. Thus, as a radial section, the stator has a star shape or, more precisely, a star-shaped ring.

These notches enable the winding to be carried out, namely the winding of the constituent copper wires of the electromagnetic coil of the stator. Therefore, in a cross section of the stator, an alternation of solid zones, in this case the metal partitions, and of open zones exists.

The operation of the brushless motors, irrespective of their configuration, generates a particular torque called cogging torque, due to the permanent and continuous offset between the magnetic field and the orientation of the magnets, when the rotor rotates relative to the stator.

By way of a reminder, according to a definition that has been accepted by the International Electrotechnical Commission (IEC), the torque referred to using the term cogging is the cyclic torque of a permanent magnet electric motor resulting from the tendency of the rotor and of the stator to align in a position corresponding to the minimum magnetic reluctance.

In other words, it involves the phenomenon of stepping type rotation resistance that is observed when the rotor rotates relative to the stator. Indeed, when the magnets are facing a metal part with a protrusion, a magnetic connection is established and afterwards there is resistance to the rotation of the rotor. In other words, the magnetic field passes through the metal zone where the air volume is the lowest.

In certain fields, such a phenomenon can at least result in a hindrance for the user of an apparatus or device implemented by such a motor. This is the case, by way of a non-limiting example, in the aeronautical field where permanent magnet electric motors ensure that the flight controls are maneuvered. Any hindrance or resistance in the handling of a flight control that is felt by the pilot can affect the control of the aircraft. In other words, fluid and continuous maneuverability needs to be maintained, without resistance, for the flight controls, with it being understood that any resistance can be interpreted by the pilot as a problem on a flight component.

In order to overcome this phenomenon of cogging, while maintaining the features and performance levels of a brushless motor as far as possible, closed rotor notches and/or notches with more or less complex shapes, and/or walls with complex shapes and/or stator partitions positioned offset relative to the poles of the magnets are known from documents US-A-2018020923, US-A-2018019648, U.S. Pat. No. 6,784,582, US-A-2005067913, US-A-2007273234, WO-A-2018008328, for example. These solutions aim to reduce cogging as far as possible.

More generally, one of the known and frequently used solutions for optimizing cogging, i.e. to reduce said cogging while affecting the performance levels of the motor as little as possible, involves laterally closing the notches or at least reducing the opening to a minimum: in this way, a volume defined by solid, or practically solid, walls is created and there is a continuity, or a quasi-continuity, of material, resulting in a magnetic field without any discontinuity, and therefore without any significant alternation of solid and empty ones. It is understood that, when the rotor surrounds the stator, there is also a solid continuous wall between the stator and the rotor. In this case, the closed wall is oriented toward the outside of the stator.

It is understood that such a solution is not easy to implement, in particular because the winding is carried out manually. In other words, the lack of an opening for the rapid passage of the winding wires affects productivity. Indeed, the copper wires are wound by successive passages through the end openings of the notches, by manual "knitting". In the case whereby a minimum opening is preserved in order to be able to carry out the winding, an opening needs to be found having a width that is such that it enables winding, while optimizing the reduction of the cogging torque. Moreover, the method for closing notches also affects the performance levels of the motor, especially since closing the notches is not easy to implement.

Document US-A-2016/315508 discloses a brushless motor comprising a stator surrounding a rotor. On the stator, partitions are provided and are connected by a wall. Said wall comprises, on the face thereof facing the rotor, a magnetic restriction zone produced by a counterbore and by a material having magnetic properties different from those of the rest of the stator.

It is known that the stator is manufactured by stacking rings with radial reliefs coplanar to the main plane of the ring. These reliefs define the partitions delimiting the notches. The notches are closed by an added part, from the internal annular space of the stacked rings, or by being surrounded with a cylinder interposed between the rings and the outer sleeve of the stator, there is an additional thickness that can affect the magnetic field and/or the air gap in the case whereby the rotor is housed in the stator.

It is these disadvantages that the invention more particularly intends to overcome by proposing a brushless type motor with a limited cogging torque, which has an easy and simple construction, while having little or no effect on the performance levels of such a motor.

SUMMARY

To this end, the invention relates to a brushless direct current motor, comprising a rotor made up of at least one permanent magnet, and a stator comprising at least three partitions radially extending from a circular based cylindrical main body, said partitions together defining at least two volumes for receiving at least three coils generating a magnetic, field, each volume being closed by a wall, formed by a portion of the body, connecting said partitions, and said wall comprising, on the face thereof that is oriented toward the rotor, at least one magnetic restriction zone, characterized in that the magnetic restriction zone is formed by at least one thinner zone of the wall, and in that a sleeve surrounds the stator and the rotor, and in that said sleeve comprises at least one deformation zone formed by cutouts and adapted to maintain the external geometrical configuration of the sleeve when mounting the constituent elements of the motor.

Thus, the presence of a magnetic restriction zone allows the magnetic field to be guided so that the field lines preferably pass through the rotor magnet and not through the walls of the notches of levels the stator. This forces the magnetic field to continuously pass through all the magnets, which reduces the effect of cogging as much as possible, by avoiding zones with a high volume of air.

According to advantageous but non-compulsory aspects of the invention, such a motor can comprise one or more of the following features:

the thinner zone is defined by a counterbore or a groove provided in the wall;

the magnetic restriction zone is formed by at least one wall portion made of at least one slightly magnetic or non-magnetic material.

The invention also relates to a method for manufacturing a motor according to the invention, characterized in that it comprises at least the following steps:

a) stacking metal rings previously machined and configured according to the cross section of the stator with partitions delimiting open volumes for receiving the coils, the stack being produced over a height corresponding to the desired length of the stator;

b) winding copper wires around the partitions on the stack obtained in step a);

c) mounting, using the lacing technique, the stack obtained in step b) in a sleeve, with angular indexing by lugs and notches enabling the stack to be positioned relative to the sleeve;

d) inserting the rotor into the volume for receiving the stator;

e) forming the part of the copper wires apparent on the ends or the coil;

f) final overmolding of the motor elements using resin.

Such a method allows precise mounting, without generating additional thickness by virtue of the lacing technique, which is per se known. Lacing enables a slightly tight adjustment between the stacks and the motor body, thus promoting magnetic and thermal conductivity between the elements.

According to advantageous but non-compulsory aspects of the invention, such a method can comprise one or more of the following steps:

after step e) and before step f), an additional step g) of grinding the external and internal diameters of the stator is carried out;

the sleeve is obtained by stacking rings;

the stacking of rings constituting the sleeve is carried out independently of steps a) to f).

BRIEF DESCRIPTION OF THE DRAWINGS

The invention will be better understood and further advantages thereof will become more clearly apparent upon reading the following description of a plurality of embodiments of the invention, which is provided by way of a non-limiting example and with reference to the accompanying drawings, in which.

DETAILED DESCRIPTION

Figure 1:
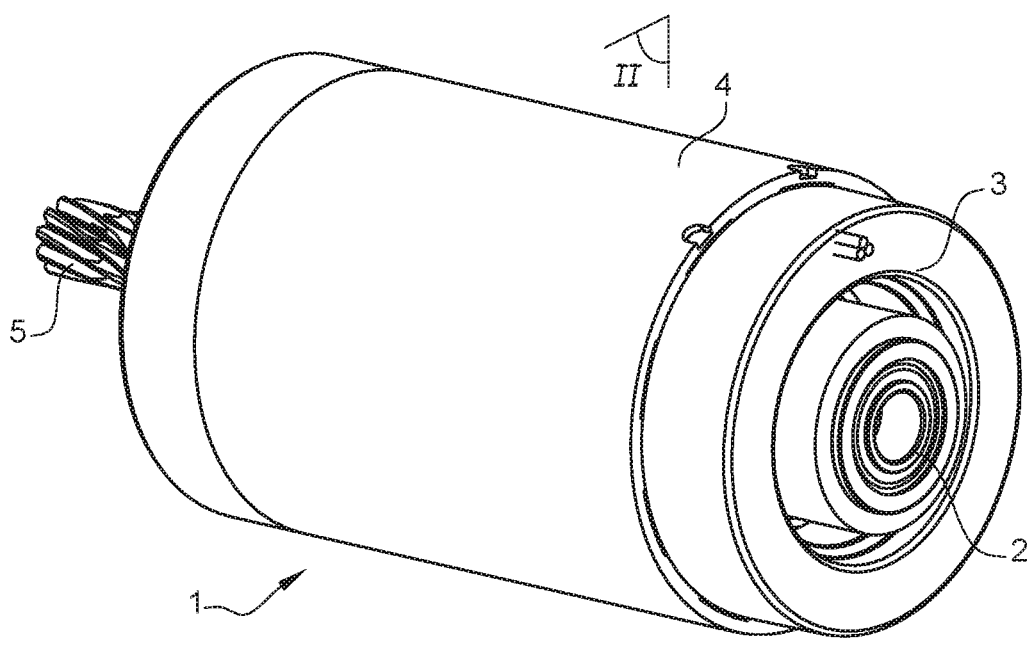
FIG. 1 is a perspective view of a brushless motor according to one embodiment of the invention.

FIG. 1 illustrates a brushless direct current motor 1 commonly designated by the term "brushless motor".

Such a motor is made of metal material and/or composites, at least for the active part. The rest of the motor, typically the constituent elements of the outer covering, can be made of composite materials or polymers.

In this case, the motor 1 is a motor according to an embodiment of the invention in which a rotor 2 is inserted into a stator 3. An outer sleeve 4 surrounds the active part of the stator 3 and defines the outer wall of the motor 1. Such a motor 1 is used in various technical fields, for example, in the aeronautical, space, medical, automotive, marine, agrifoodstuff or other industry for operating a movable component either rotationally or translationally. In this case, a rotational drive shaft 5 is directly fixed on one end of the rotor 2 and extends said rotor.

Figure 2:
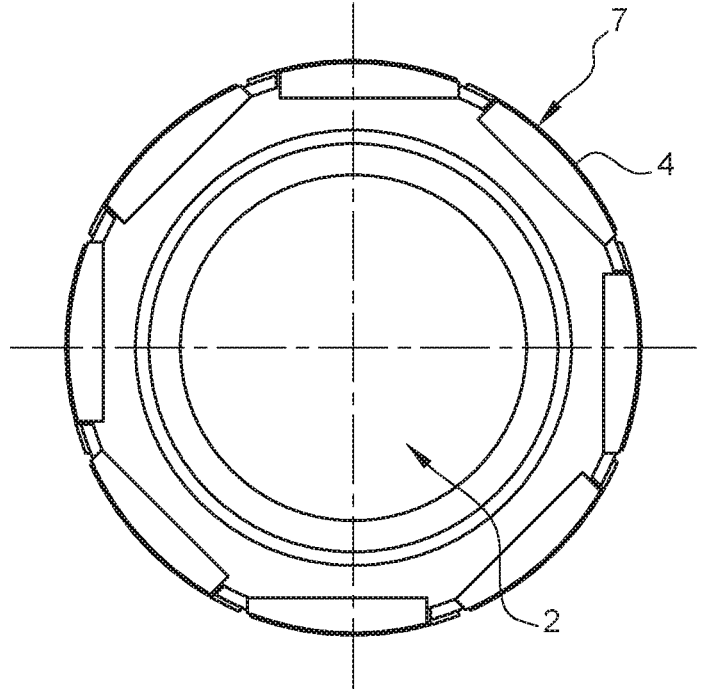
FIG. 2 is a cross section view along II-II of the motor of FIG. 1, without the stator and to a different scale.

The rotor 2 is provided, on the outer face thereof, with at least two permanent magnets. The magnets are, for example, glued on the outer face, with a glue bridge being provided between two neighboring magnets. The magnets extend over the entire length of the rotor 2. The magnets, the number of which is adapted to the size of the rotor and the motor, are disposed so that the north and south poles of two neighboring magnets are alternately oriented toward the outside and toward the inside of the rotor 2. In one embodiment, not shown, the rotor 2 is hollow. As a variant, as shown in FIG. 2, the rotor 2 is solid. The magnets, under the effect of the magnetic field generated by the stator 3, ensure the rotation of the rotor 2 and therefore of the shaft 5.

Figure 3:
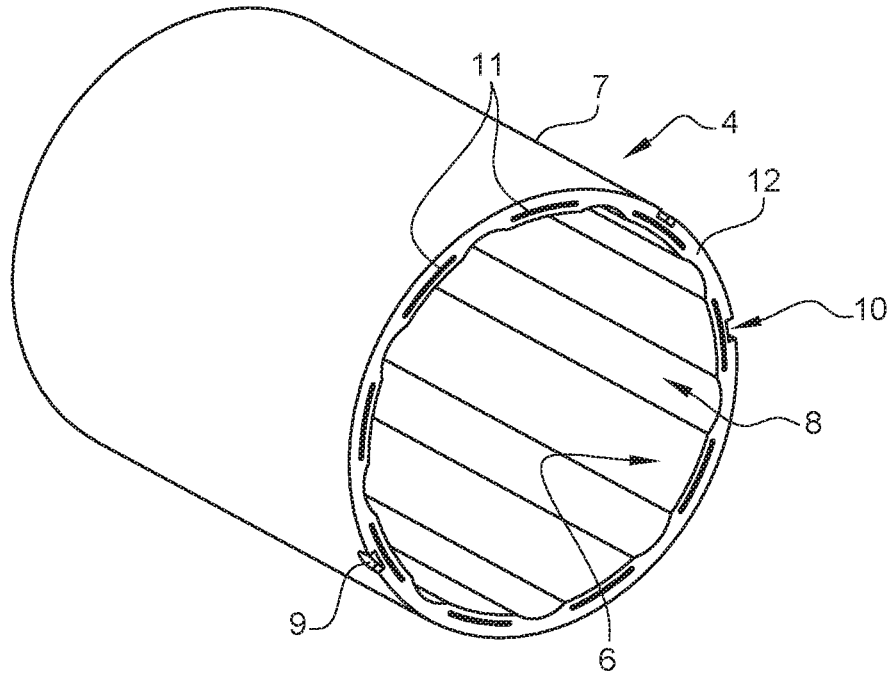
FIG. 3 is a perspective view, to a different scale, of the constituent sleeve of the stator of the motor of FIG. 1.

FIG. 3 illustrates the outer sleeve 4 ensuring the protection of the active parts of the stator 3, and therefore of the rotor when said rotor is introduced into the stator opening. The sleeve 4 has a flat and unified outer face 7. As a variant, it has a different appearance and/or it comprises an informative marking. The inner face 6 of the sleeve 4 comprises longitudinal grooves 8 or counterbores, with a rounded bottom, extending over the entire length of the face 6 of the sleeve 4. The sleeve 4 is also provided, on the outside of one of the ends thereof, with at least one lug 9 and at least one notch 10 defining an indexing and guiding component when positioning the sleeve 4 on the active part of the stator 3.

Moreover, a deformation zone is provided on the sleeve 4. In this case, it is formed by a plurality of cutouts 11 provided in the thickness of the wall 12 of the sleeve 4. This deformation zone is adapted to absorb the deformation of the active part of the stator 3 in the shape of a star, which is inserted into the sleeve, and thus maintain the outer circularity of the sleeve 4.

The active part of the stator 3 is the part of the stator 3 provided with the winding and generating the magnetic field. The active part of the stator is formed by the active parts of the constituent rings 15 by stacking the stator. Such an active part is, by analogy with FIG. 4, cylindrical, hollow and has a circular base. The dimensions and the shape of the inner opening 14 of each ring 15 are adapted to accommodate a portion of the rotor 2, while ensuring its free rotation, with a minimum amount of friction.

Several partitions 16 radially extend toward the outside of each ring 15 from the annular body 17 of the ring 15. These partitions 16 are configured as a rectangular and flat tab. The length of the partitions 16 is equal to the length L of the ring 15 and they are parallel to this length. The partitions 16 are evenly disposed on the annular body 17. In this case, the space between two neighboring partitions 16 is constant. As will become more clearly apparent in FIG. 6, two neighboring partitions are thus connected by a wall formed by a portion of the annular body. Thus, a portion of the volume for receiving the coil is defined between the partitions and the portion of the annular body.

A longitudinal groove 18 is provided, on the inner face 21 of the annular body 17, between two neighboring partitions 16. The opening of this groove 18 is oriented toward the inside of the body 17. A grooving or counterbore 19 is positioned on the outer face 20 of the annular body 17, facing the groove 18. The groove 18 and the counterbore 19 produce a thinner zone.

Figure 4:
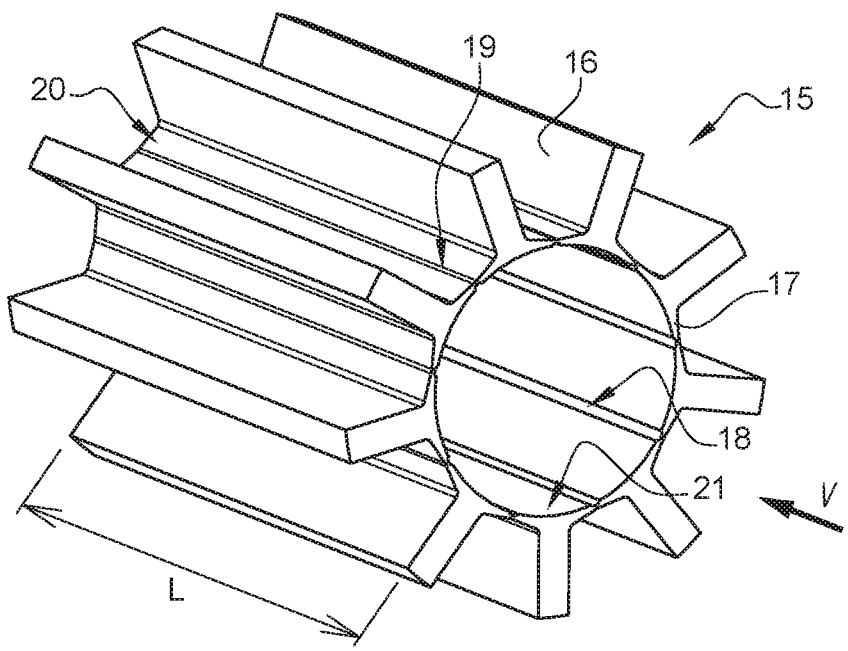
FIG. 4 is a perspective view, to a larger scale, of a ring forming, by stacking, the constituent active part of the stator of the motor of FIG. 1.

As is apparent from FIG. 4, the grooves 18 and the counterbore 19 are evenly distributed on the body 17, along the entire length L of the ring 15. The grooves 18 and the counterbore 19 are produced by removing material on the body 17. This reduction in the nominal thickness of the body 17 in a given zone, and therefore once the stacked rings 15 have decreased the active part of the stator 3, results in a magnetic restriction.

Figure 5:
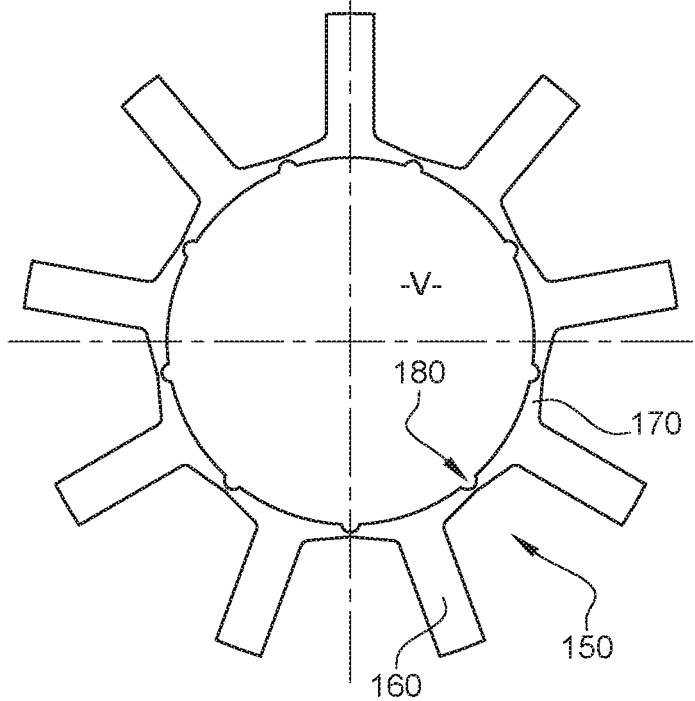
FIG. 5 is a front view of a ring similar to that of FIG. 4, to a larger scale, according to another embodiment.

FIG. 5 illustrates another embodiment of a ring 150 similar to the ring 15. In this case, only the grooves 180 are present, the grooving or the counterbore on the outer face of the body 170 are absent. In all cases, the grooves 180 ensure, like the grooves 18, a reduction in the thickness of the active portion of the stator when the rings 150 are stacked, and therefore define a magnetic restriction zone.

In another embodiment, not shown, the stack is made from rings that are equivalent, for example, to the combined features of a ring 15 and 150.

Figure 6:
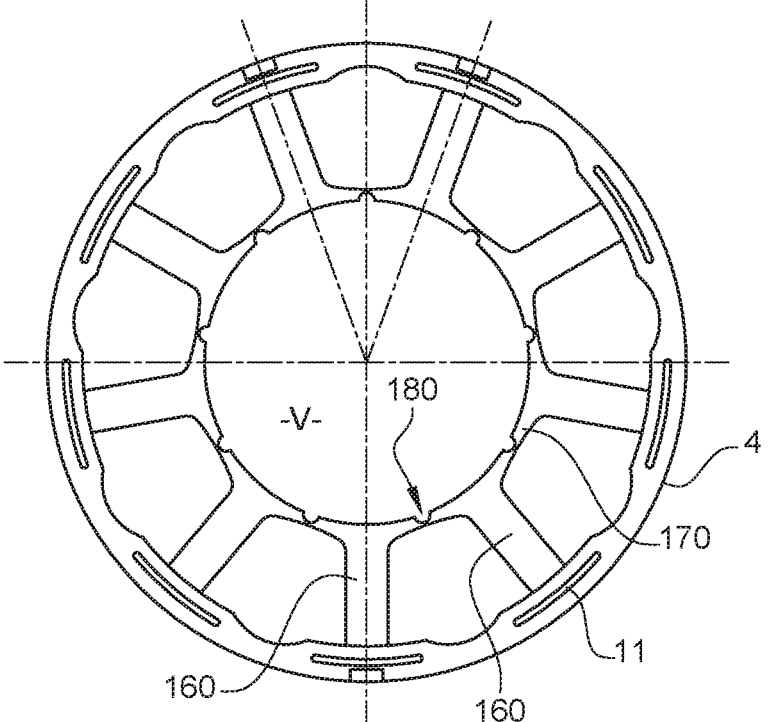
FIG. 6 is a simplified cross section view, to a different scale, of a brushless motor, without the rotor, with the ring of FIG. 5 inserted into the sleeve of FIG. 3.

As is apparent from FIG. 6, when the stator 3 is mounted, and therefore when the active part is wound and is inserted into the sleeve 4, the grooves 180 are substantially located in a central position between two neighboring partitions 160, with the winding, not shown, being in place. As shown in FIG. 6, the presence of grooves 180, due to the smaller amount of magnetic material at this point, directs the magnetic field so that it does not pass directly from one partition 160 to another, but follows a circuit through one of the magnets of the rotor, with said rotor being introduced into the volume V defined for the opening of the stacked rings 150. The rotor is then set into rotation, with its magnets attempting to align with the magnetic field. Due to the presence of the grooves 180, and therefore of the magnetic restriction zone over the entire circumference of the body 170, an even and constant circuit is brought about that enables cogging to be avoided. Moreover, the presence of cutouts 11 in the sleeve 4 provides a perfectly circular configuration for the inside of the sleeve, thus avoiding any deformation of the stacked rings, in particular in the vicinity of the partitions. This also helps to ensure even rotation of the rotor.

It is understood that the operation is identical with the rings 15 stacked according to the embodiment shown in FIG. 4.

As a variant, in another embodiment, the magnetic restriction zone is obtained by a change of material. Typically, one or more materials are used with magnetic conductivity that is lower than that of the rest of the body 17; 170 and partitions 16; 160. It is also possible to use non-magnetic materials.

Moreover, the grooves 18; 180 allow, due to the method for producing the stator 3, a precise adjustment to be achieved, with optimum contact between the parts to ensure thermal and magnetic conductivity, without deformation of the constituent parts.

The mounting of such a motor will now be described with reference to the various figures. To this end, a stack of rings 15; 150 is initially made that constitutes the active part of the stator 3. These rings 15; 150 were previously machined and configured, according to the cross section of the stator to be obtained. The number of rings to be stacked depends on the desired length of the stator 3. Once the stack is made, the winding is carried out by winding the copper wire around the partitions 16; 160 from the open zone. Such winding is easy to produce, since there is no obstacle hindering handling.

Once the winding is carried out, a stack of circular rings, not illustrated, constituting the sleeve 4 is produced. It is understood that the stack for the sleeve is independent of the rest of the method and that it advantageously can be carried out at another location and/or at another time than simultaneously with the winding. In other words, it is possible to produce the sleeve 4 by stacking a number of rings that is defined according to the length of the sleeve to be obtained, independently of the mounting of the active part and the winding. It is understood that, when the winding is carried out, it is important that the volumes receiving the coils are closed quickly by installing the stack of rings constituting the sleeve.

The previously obtained active part is then inserted into the sleeve 4 using the lacing technique. By way of a reminder lacing refers to the assembly of two parts with a tight fit. Assembly is carried out by heating the outer part or hoop, which allows the cold part to be laced to be introduced into the hoop or into a housing provided in the hoop. The adjustment between the parts is made by cooling the parts to the same temperature. Such a technique allows a homogeneous and similar adjustment at any point in the zone for assembling the parts together.

Positioning the parts during lacing is facilitated by the presence of the lugs 9 and notches 10, which allow indexed positioning of the parts.

The grooves 18; 180 also allow, during temperature variations, the parts of each ring 15; 150 to deform, and thus adjust, independently of each other, in a resilient manner.

The deformation zones 11 of the sleeve 4 mentioned above also help to define resilient behavior of the sleeve 4. This results in reduced stresses and deformations on the entire stator 3.

The mounting of the motor is finalized by shaping the copper wire portions of the winding that appear on the ends. This step is referred to as coil production.

A final step involves overmolding all the elements of the stator and of the rotor with a protective resin.

Figure 7:
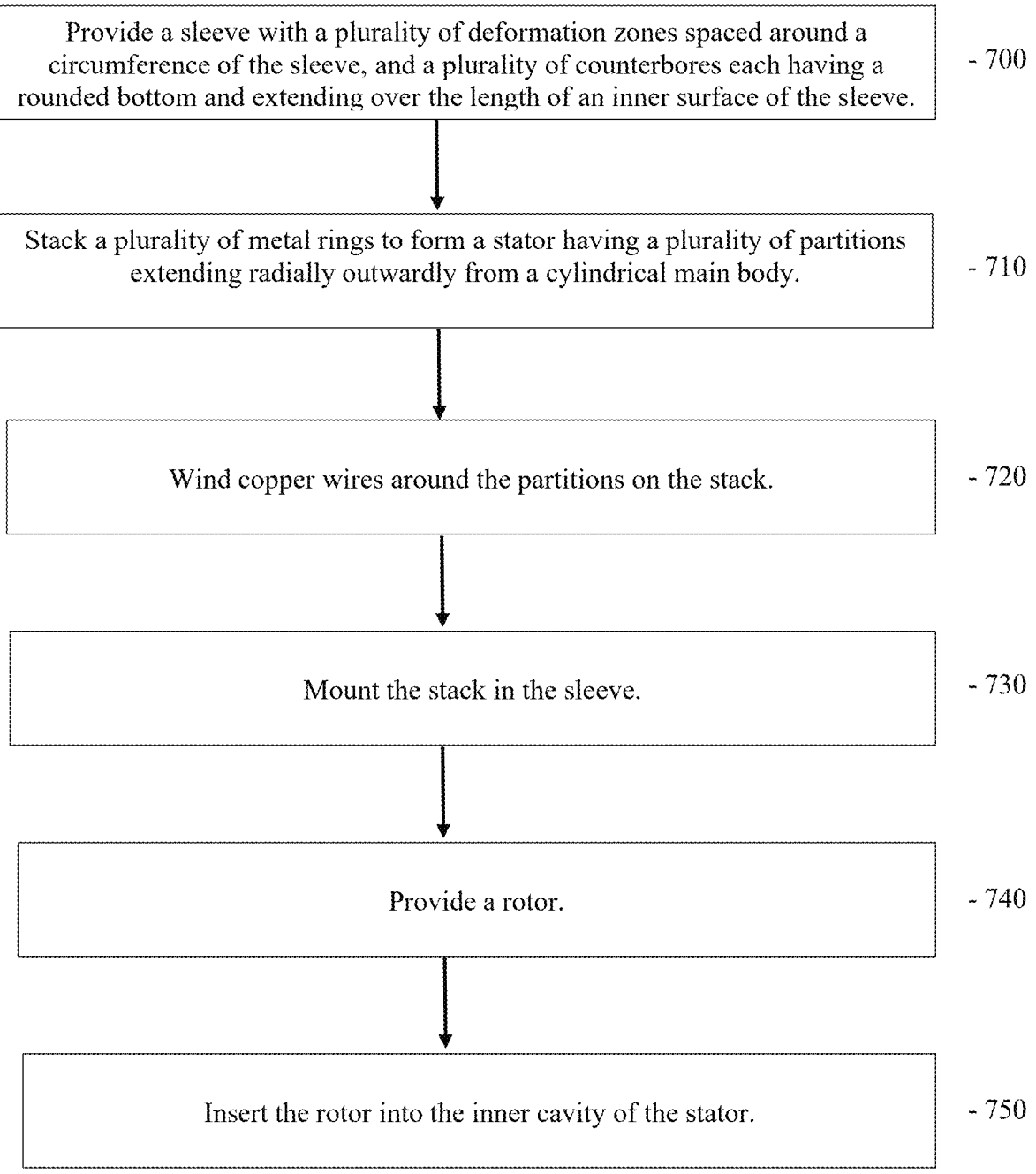
FIG. 7 is a flow chart describing an example method of manufacturing a brushless direct current electric motor according to the disclosure.

A non-limiting example method for manufacturing a brushless motor according to the disclosure is described in relation to FIG. 7.

At step 700 a sleeve is provided with a plurality of deformation zones spaced around a circumference of the sleeve, and a plurality of counterbores each having a rounded bottom and extending over the length of an inner surface of the sleeve. In some embodiments only one of the plurality of counterbores is disposed between adjacent ones of the plurality of deformation zones.

At step 710, a plurality of metal rings are stacked to form a stator having a plurality of partitions extending radially outwardly from a cylindrical main body. In some embodiments each of the plurality of partitions has a flat end face for engaging the inner surface of the sleeve. In some embodiments the stator delimits open volumes for receiving coils.

At step 720, copper wires are wound around the partitions on the stack.

At step 730, the stack is mounted in the sleeve. In some embodiments mounting can comprise positioning the plurality of deformation zones such that the end faces of the plurality of partitions are positioned adjacent associated ones of the plurality of deformation zones.

At step 740, a rotor is provided.

At step 750, the rotor is inserted into the inner cavity of the stator.

The invention claimed is:

1. A method for manufacturing a brushless motor, the method comprising steps of:
   providing a sleeve having a plurality of deformation zones spaced around a circumference of the sleeve, and a plurality of counterbores each having a rounded bottom and extending over the length of an inner surface of the sleeve, wherein only one of said plurality of counterbores is disposed between adjacent ones of said plurality of deformation zones;
   stacking a plurality of metal rings to form a stator having a plurality of partitions extending radially outwardly from a cylindrical main body, each of the plurality of partitions including a flat end face for engaging the inner surface of the sleeve, the stator delimiting open volumes for receiving coils;
   winding copper wires around the partitions on the stack;
   mounting the stack in the sleeve, wherein the mounting of the stack further comprises positioning said plurality of deformation zones such that said end faces of the plurality of partitions are positioned adjacent associated ones of said plurality of deformation zones;
   providing a rotor; and
   inserting the rotor into an inner cavity of the stator.

2. The method of claim 1, further comprising grinding external and internal diameters of the stator.

3. The method of claim 1, further comprising forming the sleeve by stacking a plurality of rings.

4. The method of claim 1, further comprising forming the rotor from at least one permanent magnet disposed on an outer face of the rotor.

5. The method of claim 4, wherein the forming of the rotor comprises forming the permanent magnet so that the permanent magnet extends over an entire length of the rotor.

6. The method of claim 1, wherein the mounting of the stack comprises positioning the sleeve to surround an active part of the stator, wherein the forming step comprises providing the active part of the stator as a portion of the stator having said winding of copper wires.

7. The method of claim 1, further comprising forming a thinned zone in a main body of said stator.

8. The method of claim 7, said forming the thinned zone comprises forming a groove in said main body of said stator.

9. The method of claim 1, wherein said stacking the plurality of metal rings further comprises forming the plurality of partitions to extend radially outwardly from a cylindrical main body of said stator so that said partitions together define at least two volumes for receiving at least three coils for generating a magnetic field.

10. The method of claim 9, wherein said stacking the plurality of metal rings further comprises forming the plurality of partitions so that each volume is closed by a second wall formed by a portion of the main body connecting the partitions so that said second wall comprises a magnetic restriction zone formed by at least one wall portion made of at least one slightly magnetic or non-magnetic material.

11. The method of claim 9, wherein said stacking the plurality of metal rings further comprises forming the plurality of partitions so that each volume is closed by a second wall formed by a portion of the main body connecting the partitions so that the second wall comprises a magnetic restriction zone formed by at least one zone thinner than said second wall.

12. The method of claim 11, wherein said forming the plurality of partitions comprises forming said magnetic restriction zone on an inner face of said second wall oriented toward said rotor.

13. The method of claim 11, wherein said forming the plurality of partitions further comprises forming the thinner zone as a groove.

14. The method of claim 11, wherein the thinner zone is formed by a groove on an inner face of said main body of said stator and a grooving positioned on an outer face of said main body of said stator.

* * * * *